(12) United States Patent
Talja et al.

(10) Patent No.: US 9,385,590 B2
(45) Date of Patent: Jul. 5, 2016

(54) ARRANGEMENT AND METHOD FOR A VEHICLE INVERTER DRIVE

(71) Applicant: ABB Oy, Helsinki (FI)

(72) Inventors: Markku Talja, Järvenpää (FI); Pertti Seväkivi, Lepsämä (FI)

(73) Assignee: ABB Technology OY, Helsinki (FI)

( * ) Notice: Subject to any disclaimer, the term of this patent is extended or adjusted under 35 U.S.C. 154(b) by 423 days.

(21) Appl. No.: 14/079,126

(22) Filed: Nov. 13, 2013

(65) Prior Publication Data

US 2014/0152210 A1 Jun. 5, 2014

(30) Foreign Application Priority Data

Nov. 14, 2012 (FI) ...................................... 20126193

(51) Int. Cl.
| B60L 1/00 | (2006.01) |
| H02G 3/00 | (2006.01) |
| H02M 1/44 | (2007.01) |
| H02M 7/00 | (2006.01) |
| H02M 7/493 | (2007.01) |

(52) U.S. Cl.
CPC .............. *H02M 1/44* (2013.01); *B60L 2200/26* (2013.01); *B60L 2210/40* (2013.01); *H02M 7/003* (2013.01); *H02M 7/493* (2013.01); *Y02T 10/7241* (2013.01)

(58) Field of Classification Search
CPC ....... H02M 1/44; H02M 7/003; H02M 7/493; B60L 2200/26; B60L 2210/40; Y02T 10/7241
USPC ......................................................... 307/9.1
See application file for complete search history.

(56) References Cited

U.S. PATENT DOCUMENTS

2008/0205097 A1    8/2008  Miettinen

FOREIGN PATENT DOCUMENTS

| FI | 119580 B | 12/2008 |
| JP | 59-89581 A | 5/1984 |
| JP | 63-99782 A | 5/1988 |
| JP | 1-283065 A | 11/1989 |
| JP | 2009-027089 A | 2/2009 |

OTHER PUBLICATIONS

Search Report dated Sep. 13, 2013, by the Finnish Patent Office for Application No. 20126193.

*Primary Examiner* — Hal Kaplan
(74) *Attorney, Agent, or Firm* — Taft Stettinius & Hollister LLP

(57) ABSTRACT

A method and arrangement are disclosed for a vehicle inverter drive having a voltage distribution block and two or more inverters, intermediate circuits of which are connected in parallel to the voltage distribution block for supplying voltage to the intermediate circuits, in which the intermediate circuits of the inverters are interconnected with a coaxial cable to minimize inductance in the parallel connection.

10 Claims, 1 Drawing Sheet

ARRANGEMENT AND METHOD FOR A
VEHICLE INVERTER DRIVE

RELATED APPLICATION

This application claims priority under 35 U.S.C. §119 to Finnish Patent Application No. 20126193 filed in Finland on Nov. 14, 2012, the entire content of which is hereby incorporated by reference in its entirety.

FIELD

The present disclosure relates to vehicle inverter drives and, for example, to oscillation in parallel-connected intermediate circuits of inverters of drives.

BACKGROUND INFORMATION

In vehicle inverter drives, for example of electric trains or trams, intermediate circuits of inverters may be connected in parallel. There may be two to ten parallel inverters, for example. The intermediate circuits of inverters may include film capacitors of small capacitance, the equivalent series resistance (ESR) of which is low. In such circuits, the parallel connection may be the resonant circuit that is formed by the intermediate circuit capacitors and the conductors between them and that has low damping.

Oscillation caused by the resonant circuit may complicate drive control and also damage the drive components.

SUMMARY

An arrangement for a vehicle inverter drive is disclosed, the arrangement comprising: a voltage distribution block; two or more inverters, intermediate circuits of which are connected in a parallel connection to the voltage distribution block for supplying voltage to the intermediate circuits; and a coaxial cable for interconnecting the intermediate circuits of the inverters to reduce inductance in the parallel connection.

A method is also disclosed for a vehicle inverter drive having a voltage distribution block and two or more inverters, intermediate circuits of which are connected in a parallel connection to the voltage distribution block, the method comprising: supplying voltage from the voltage distribution block to the intermediate circuits; and interconnecting the intermediate circuits of the inverters via a coaxial cable for reducing inductance in the parallel connection.

BRIEF DESCRIPTION OF THE FIGURES

The invention will be described in greater detail in connection with preferred exemplary embodiments, and with reference to the accompanying drawings, in which.

DETAILED DESCRIPTION

A method and an apparatus are disclosed to affect the resonance frequency of a resonant circuit formed by a parallel connection of intermediate circuits. By reducing inductance of conductors connecting the intermediate circuits, it is possible to increase the resonance frequency of the resonant circuit. Thus, the losses in the intermediate circuits are able to damp oscillation of higher frequency.

The inductance of the conductors can be reduced by connecting the intermediate circuits with a coaxial cable. The coaxial cable may be a single-phase cable the armoring of which forms the other connector of the cabling. To ensure high current rating, the cross-sectional area of the armoring may be, for instance, half or more than half of the cross-sectional area of the phase conductor of the single-phase cable.

In a vehicle inverter drive, in which intermediate circuits of a plurality of inverters are connected in parallel, the parallel connection may form a resonant circuit. If the arrangement includes, for example, a voltage distribution block and two or more inverters, the intermediate circuits of which are connected in parallel to the voltage distribution block for supplying voltage to the intermediate circuits, a poorly damped second-order resonant circuit may appear between the modules, especially if for example the capacitors used in the intermediate circuits have low ESR. Oscillation of the resonant circuit may make it difficult or impossible to control the drive and also may damage the components of the drive.

However, it is possible to affect the resonance frequency of the resonant circuit. For instance, the resonance frequency can be increased by minimizing inductance of conductors of the parallel connection. Thus, the losses in the intermediate circuits of the inverters of the drive are able to damp the new oscillation of higher frequency in the resonant circuit.

To minimize inductance of the parallel connection, the intermediate circuits may be interconnected with a coaxial cable. The coaxial cable may be, for instance, an armored single-phase cable, the armoring of which acts as another conductor.

To ensure higher current rating, the cross-sectional area of the armoring may be, for instance, half or more than half of the cross-sectional area of the phase conductor of the single-phase cable.

Figure 1:
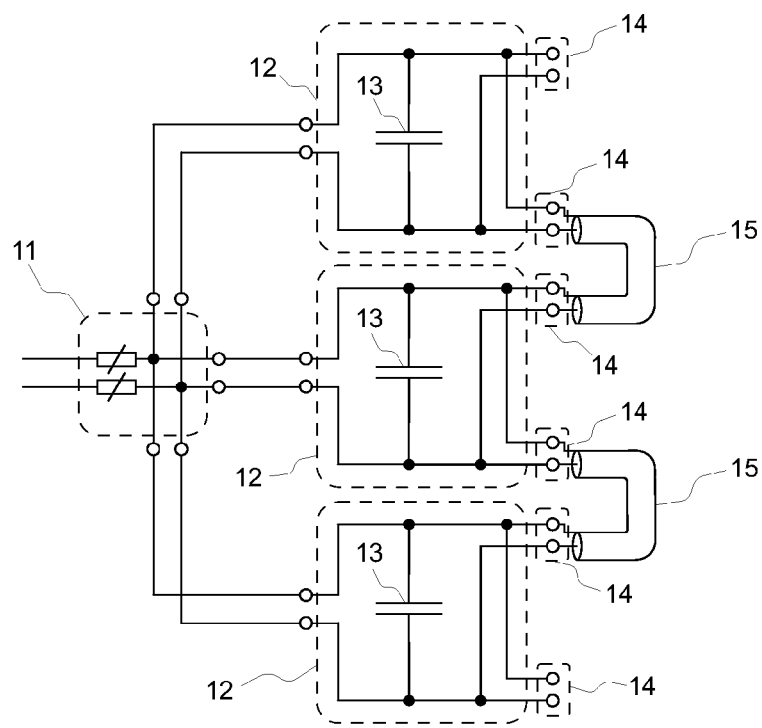
FIG. 1 shows an exemplary arrangement disclosed herein for a vehicle inverter drive.

FIG. 1 shows an exemplary arrangement disclosed herein for a vehicle inverter drive. The arrangement of FIG. 1 includes a voltage distribution block 11 and three inverters 12. In FIG. 1, the inverter modules are identical.

As to the inverters 12, FIG. 1 shows their intermediate circuits 13, which are connected in parallel to the voltage distribution block 11 for supplying voltage to the intermediate circuits 13. The number of inverters 12 is not restricted to three in the arrangement, but rather there may be two or more than three inverters.

The intermediate circuits 13 of the inverters 12 are interconnected with a coaxial cable to minimize inductance of the parallel connection. In FIG. 1, each inverter 12 includes two linking connectors 14, each of which includes two terminals. The linking connectors are connected to poles of the intermediate circuits 13 of the inverters 12. One of the terminals of the linking connector is connected to the positive pole of the intermediate circuit and the other to the negative pole. The linking connectors 14 of different inverters 12 are interconnected by means of, for example, a coaxial cable 15.

In FIG. 1, the coaxial cable 15 is an armored single-phase cable, the armoring of which acts as another conductor. To ensure higher current rating, the cross-sectional area of the armoring is half or more than half of the cross-sectional area of the phase conductor of the cable 15.

To further reduce the inductance produced by the coaxial cables 15, the length of the cables 15 can be minimized by placing the inverters 12 as close to one another as possible, yet maintaining the desired creepage distance.

Figure 2:
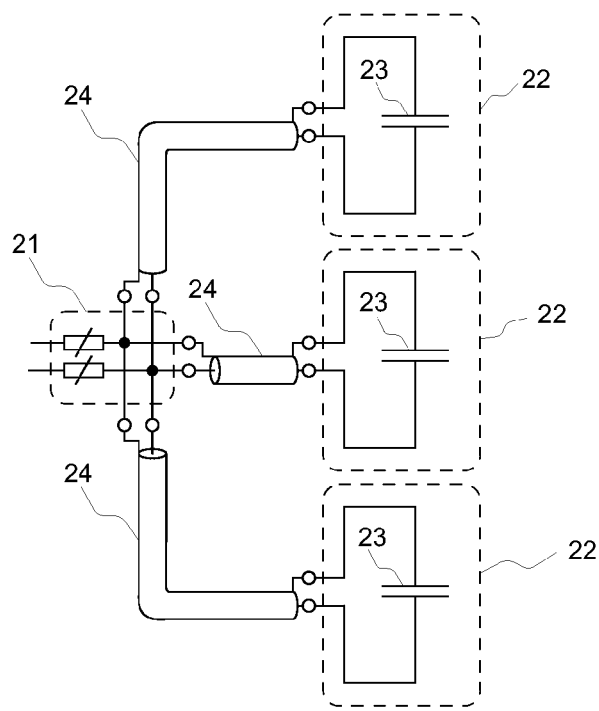
FIG. 2 shows another exemplary arrangement disclosed herein for a vehicle inverter drive.

FIG. 2 shows another exemplary arrangement disclosed herein for a vehicle inverter drive. The arrangement of FIG. 2 also includes a voltage distribution block 21 and three inverters 22, the intermediate circuits 23 of which are connected in parallel to the voltage distribution block 21 for supplying voltage to the intermediate circuits 23.

To minimize inductance of the parallel connection, the intermediate circuits 23 are connected to the voltage distribution block 21 by coaxial cables 24. As described herein, the coaxial cable 24 can be an armored single-phase cable, the armoring of which acts as another conductor.

To ensure higher current rating, the cross-sectional area of the ararmoring is half or more than half of the cross-sectional area of the phase conductor of the cable 24.

To minimize the inductance produced by the coaxial cables 24, the distance between the inverters 22 may be minimized within the limits of the desired creepage distance.

It will be apparent to those skilled in the art that the basic ideas disclosed herein may be implemented in many different ways. The invention and its embodiments are thus not restricted to the examples described herein but may vary within the scope of the claims.

It will thus be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. An arrangement for a vehicle inverter drive, the arrangement comprising:
   a voltage distribution block;
   two or more inverters, intermediate circuits of which are connected in a parallel connection to the voltage distribution block for supplying voltage to the intermediate circuits; and
   a coaxial cable for interconnecting the intermediate circuits of the inverters to reduce inductance in the parallel connection.

2. An arrangement as claimed in claim 1, wherein the coaxial cable is an armored single-phase cable, the armoring of which acts as another conductor.

3. An arrangement as claimed in claim 2, wherein a cross-sectional area of the armoring is half or more than half of a cross-sectional area of a phase conductor of the single-phase cable.

4. An arrangement as claimed claim 1, wherein the inverters comprise:
   linking connectors connected to poles of the intermediate circuits of the inverters, the linking connectors of different inverters being interconnected with a coaxial cable.

5. An arrangement as claimed in claim 1, wherein the intermediate circuits of the inverters are connected to the voltage distribution block with coaxial cables.

6. An arrangement as claimed claim 2, wherein the inverters comprise:
   linking connectors connected to poles of the intermediate circuits of the inverters, the linking connectors of different inverters being interconnected with a coaxial cable.

7. An arrangement as claimed in claim 2, wherein the intermediate circuits of the inverters are connected to the voltage distribution block with coaxial cables.

8. An arrangement as claimed claim 3, wherein the inverters comprise:
   linking connectors connected to poles of the intermediate circuits of the inverters, the linking connectors of different inverters being interconnected with a coaxial cable.

9. An arrangement as claimed in claim 3, wherein the intermediate circuits of the inverters are connected to the voltage distribution block with coaxial cables.

10. A method for a vehicle inverter drive having a voltage distribution block and two or more inverters, intermediate circuits of which are connected in parallel connection to the voltage distribution block, the method comprising:
    supplying voltage from the voltage distribution block to the intermediate circuits; and
    interconnecting the intermediate circuits of the inverters via a coaxial cable for reducing inductance in the parallel connection.

* * * * *